(12) United States Patent
Schell et al.

(10) Patent No.: US 6,534,995 B1
(45) Date of Patent: Mar. 18, 2003

(54) CIRCUIT FOR DETECTING A COOLING DEVICE IN A COMPUTER SYSTEM

(75) Inventors: J. David Schell, Round Rock, TX (US); Joe A. Ricks, Austin, TX (US); Edward C. Guerrero, Jr., Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 92 days.

(21) Appl. No.: 09/766,481

(22) Filed: Jan. 19, 2001

(51) Int. Cl.[7] .............................. G01R 31/28; G06F 1/30
(52) U.S. Cl. ........................................ 324/511; 713/300
(58) Field of Search .............................. 324/511, 522, 324/525; 340/584; 318/434; 713/300, 340; 361/687, 690, 695, 676; 388/909

(56) References Cited

U.S. PATENT DOCUMENTS

| | | | |
|---|---|---|---|
| 5,135,718 A | 8/1992 | Kawaguchi et al. | 422/70 |
| 5,568,350 A | 10/1996 | Brown | 361/104 |
| 5,612,677 A | 3/1997 | Baundry | 340/584 |
| 5,714,938 A * | 2/1998 | Schwabl | 340/584 |
| 5,848,282 A | 12/1998 | Kang | 713/323 |
| 5,977,733 A * | 11/1999 | Chen | 318/434 |
| 6,020,820 A * | 2/2000 | Chiang | 340/584 |
| 6,265,790 B1 * | 7/2001 | Vogman | 307/139 |

* cited by examiner

Primary Examiner—Christine Oda
Assistant Examiner—James Kerveros
(74) Attorney, Agent, or Firm—Robert C. Kowert; Meyertons, Hood, Kivlin, Kowert & Goetzel, P.C.

(57) ABSTRACT

A cooling device detection circuit and method for detecting a cooling device in a computer system. In one embodiment, a cooling device detection circuit includes a detection stage and a power management stage. The detection stage is configured to sense an indication that the cooling device is functioning and to assert a signal if the cooling device is detected. The power management stage is configured to turn off a component cooled by the cooling device if the cooling device is not detected.

33 Claims, 9 Drawing Sheets

CIRCUIT FOR DETECTING A COOLING DEVICE IN A COMPUTER SYSTEM

BACKGROUND OF THE INVENTION

1. Field of the Invention

This invention relates to computer systems. More particularly, this invention relates to detecting a cooling device in a computer system.

2. Description of the Related Art

As CPUs and other components such as hard disks and graphics processors increase their operating frequency, they consume more power and consequentially generate more heat. At the same time, increased transistor density has also caused some components to produce more heat. Because components are designed to operate within a certain temperature range, this increased heat generation may cause many problems. Many errors can occur once a component begins to overheat. For example, system crashes, random reboots, and system lockup are common errors caused by an overheating processor. Furthermore, extended high temperatures may damage the components themselves. Thus in modem computer systems, specialized cooling systems are required to prevent heat-related problems.

With earlier components, all that was needed to adequately dissipate heat may have been a passive heat sink attached to the component. A passive heat sink is simply a piece of metal attached to the component in such a way that it draws heat away from the component and radiates this heat into the surrounding air. As components began generating more heat, fins were added to heat sinks. Fins increase the surface area of a heat sink, allowing the heat sink to radiate more heat. A fan placed somewhere in the computer case assists passive heat sinks by circulating cooler air across the heat sink, allowing more heat to be radiated away. Most computer systems include, at a minimum, one or more passive heat sinks and a fan located somewhere in the case. Some computer systems may contain other cooling devices in addition to or instead of fans and/or passive heat sinks. In any computer system, failure of a cooling device may result in one or more of the system components overheating.

For some newer components, a passive heat sink may no longer satisfactorily remove enough heat. For example, many newer processors require active heat sinks. An active heat sink is a passive heat sink connected to a dedicated fan or other active cooling device. The fan is attached so that it blows directly over the heat sink to provide additional cooling. Some heat sinks also include a Peltier cooler, which is a solid-state device that pumps heat from one of its sides to the other. Including a Peltier cooler may increase cooling of a particular component, but the Peltier element may also increase the overall heat generated in the system.

While an active heat sink configuration may be capable of radiating enough heat away from the component to prevent overheating, it also has its drawbacks. Like all active components, active cooling devices such as fans may be susceptible to failure. Fans used in computer systems are often inexpensive and unreliable, making them even more likely to malfunction. If a cooling device such as a fan or a Peltier cooler does malfunction, active heat sinks are often incapable of adequately cooling the component anymore. This may happen because the metal heat sink is smaller than it would have been if it had been designed to be used without the cooling device. Additionally, since other cooling measures such as the system fan were no longer as necessary to cooling that particular component after the addition of the dedicated cooling device, the other cooling measures may have been placed so that they no longer directly cool the active heat sink. In heat sinks incorporating Peltier coolers, the extra heat generated by the Peltier element creates an even greater risk to the component if the fan or other cooling device fails.

Thus, when operating properly, heat sinks, fans and other cooling devices can usually prevent heat-related problems from endangering system performance and components. However, as mentioned above, cooling devices such as fans may not always be very reliable components, and cooling device failure may endanger components and may also have detrimental effects on system performance. Prior art systems have recognized this possibility. For example, alarm circuits that detect processor overheating are available. These alarm circuits may monitor the processor fan power supply, the temperature of the processor, or the airflow through a fan that cools a processor. These circuits are configured to generate an alarm when they detect a condition that may lead to processor overheating.

Alternately, some systems have tried to avoid relying on active cooling devices at all, opting instead for purely passive heat sinks. This option is limited. For example, many computer systems are being designed to fit inside smaller cases, so there may be limits on the extent that a passive heat sink's surface area can be increased. When a heat sink's surface area is limited, the amount of heat it can dissipate is correspondingly limited. Also, many case and/or motherboard configurations place the power supply fan too far away from or facing in the wrong direction of the heat sink needing air circulation. Because there is little airflow over the heat sink, its heat radiating abilities are further limited. Because of these limits, many newer components can no longer be adequately cooled without an active heat sink or cooling device.

As discussed above, cooling device failure is an important concern in a computer system. If a cooling device fails, components may not be properly cooled. Expensive components such as the processor may overheat, causing unreliable performance and possibly even destroying the components themselves. Even if the component is only connected to a passive heat sink, the passive heat sink may depend on a different cooling device such as a fan used to cool a power supply to circulate enough air across the heat sink or to otherwise allow the heat sink to adequately draw enough heat away from the component.

SUMMARY

Various embodiments of a method and circuit for detecting a cooling device in a computer system are disclosed. In one embodiment, a computer system includes a cooling device configured to cool a component, a power supply configured to power the component, and a cooling device detection circuit configured to detect the cooling device. The cooling device detection circuit includes a detection stage and a power management stage. The detection stage is configured to detect the cooling device by sensing an indication that the cooling device is functioning. The power management stage is coupled to the detection stage and is configured to turn the power supply off if the cooling device is not detected.

In some embodiments, the cooling device may include a fan that is part of an active heat sink coupled to a CPU. Alternately, the cooling device may include a fan configured to cool a main power supply in the computer system.

The indication that the cooling device is functioning may, in some embodiments, include an indication that current is flowing across the cooling device. In some embodiments where the cooling device includes a fan, the indication that the cooling device is functioning may include a tachometer signal.

The power management stage may be configured to receive an input indicating whether the computer system is in a power conservation mode in one embodiment. The power management stage may, in some embodiments, receive an input indicating whether the computer system is requesting that the cooling device be turned off. If the computer system is in a power conservation mode or requesting that the cooling device be turned off, the power management stage may be configured to turn the cooling device off. The power management stage may receive an input indicating whether the voltages in the computer system have stabilized in some embodiments. The power management stage may turn the power supply off by deasserting a signal that controls the power supply. A south bridge may generate the signal.

In another embodiment, a method for detecting a cooling device in a computer system is disclosed. The method includes detecting the cooling device by sensing an indication that the cooling device is functioning and if the cooling device is not detected, turning off a power supply that provides a component cooled by the cooling device with power. The component being cooled may be a CPU. The method may also include sensing whether a plurality of voltages in the computer system have stabilized, sensing whether the computer system is in a power conservation mode, and/or sensing whether the computer system is requesting that the fan be turned off.

The indication that the cooling device is functioning may be sensed by sensing a current flowing from a ground terminal of the cooling device to ground in some embodiments. In some embodiments, sensing may include sensing a tachometer signal.

In one embodiment of a cooling device detection circuit, the circuit may include a current-detecting device configured to sense current flowing from a ground terminal of a cooling device to ground. The circuit may also include a signaling device configured to assert a detection signal if the current-detecting device senses the current and to deassert the detection signal if the current-detecting device does not sense the current. In some embodiments, the cooling device detection circuit may include a diode and a transistor. The diode may be coupled between a ground terminal of the cooling device and ground so that when current flows from the ground terminal to ground a voltage drop is produced across the diode. The transistor may be configured to turn on in response to the voltage drop being produced across the diode. The signaling device may include a transistor configured to turn on in response the current-detecting device sensing the current and to turn off in response to the current-detecting device not sensing the current in one embodiment. In one embodiment, the circuit may include an interface configured to generate an interrupt that causes an alarm.

In one embodiment of a fan detection circuit, the circuit includes a tachometer-detecting device configured to sense a tachometer signal provided by the fan. The circuit may also include a signaling device configured to assert a detection signal if the tachometer-detecting device senses the tachometer signal and to keep the detection signal unasserted if the tachometer-detecting device does not sense the tachometer signal. In one embodiment, the tachometer-detecting device may be configured to sense the tachometer signal by continuously monitoring the tachometer signal. In another embodiment, the tachometer-detecting device may be configured to sense the tachometer signal by latching a first pulse of the tachometer signal. In one embodiment, the fan detection circuit may include an interface configured to initiate an interrupt that causes an alarm if the detection signal is not asserted.

Figure 1:
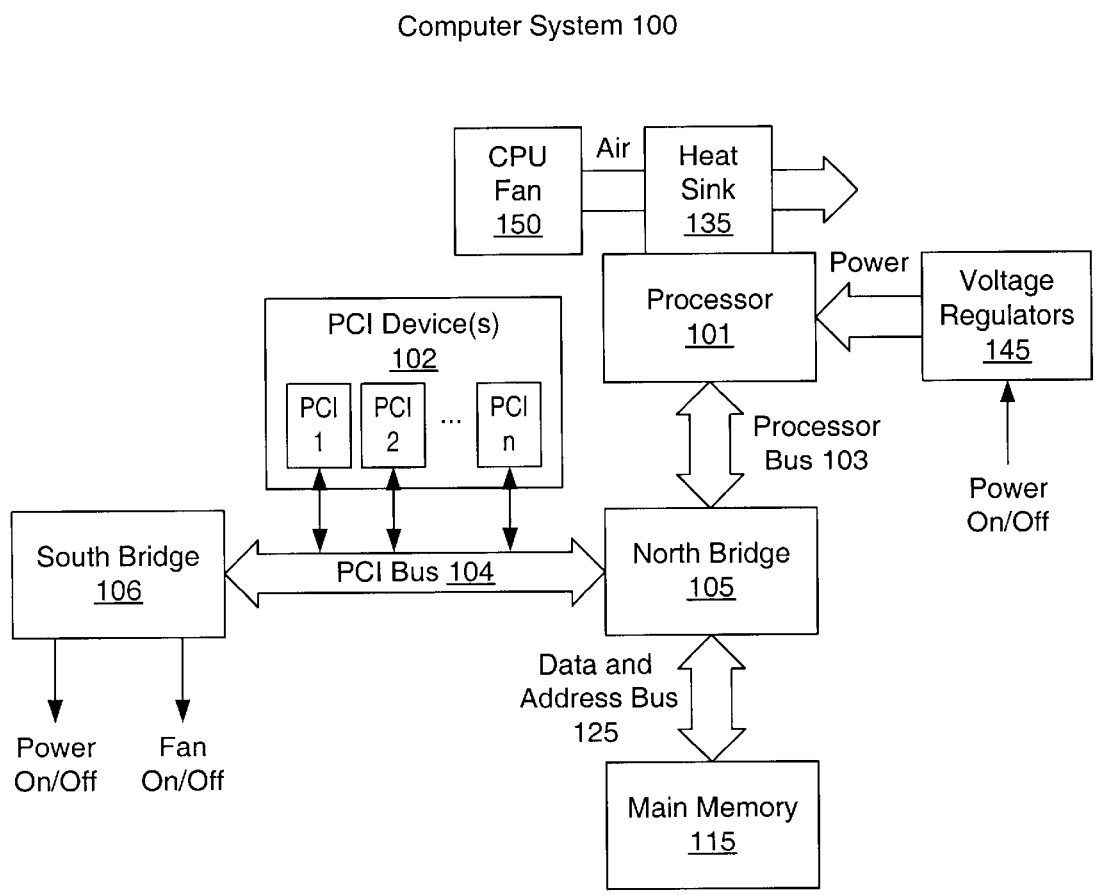
FIG. 1 is a block diagram of a computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

FIG. 1 shows one example of a computer system 100. The computer system 100 has one or more central processing units (CPUs) 101 coupled by a processor bus 103 to a north bridge 105. Each CPU may be coupled to an active heat sink that includes a fan 150 and a passive heat sink 135, where the fan 150 is coupled to the passive heat sink 135 so that the fan 150 can circulate hot air away from the passive heat sink 135. Alternately, in some embodiments, the fan 150 may not be part of an active heat sink and thus not coupled to the passive heat sink 135 even though the fan 150 may still be configured to circulate hot air away from the heat sink 135. The computer system 100 may also include additional fans (not shown). For example, the case containing the computer system 100 may include a fan that cools the power supply. Also, the computer system 100 may include other cooling devices, such as Peltier coolers.

In one embodiment, one or more voltage regulators 145 may provide power to the processor(s) 101. The north bridge 105, also known as a system controller, may contain such devices as a system bus interface, a memory controller, a Peripheral Component Interconnect (PCI) bus controller, and an Accelerated Graphics Port (AGP). Preferably, the north bridge 105 forwards data, address and control signals between the processor bus, the PCI bus and the memory. The north bridge 105 is coupled to a main memory 115 by a data and address bus 125. The PCI bus 104 couples the north bridge 105 to a south bridge 106. The south bridge 106, also known as a peripheral bus controller, may contain devices such as a PCI to Industry Standard Architecture (ISA) bridge, an Enhanced Integrated Device Electronics (EIDE) controller, and a Universal Serial Bus (USB) controller. The south bridge 106 may perform administrative functions such as interrupt management, clock/calendar/timer functions, configuration management, power supply control, and power-on signal sequencing. The PCI bus 104 is connected to one or more PCI devices 102.

As mentioned earlier, cooling devices used in computer systems may fail. If a cooling device fails, devices such as active or passive heat sinks may be unable to remove heat adequately and component malfunction or damage may result.

Figure 2:
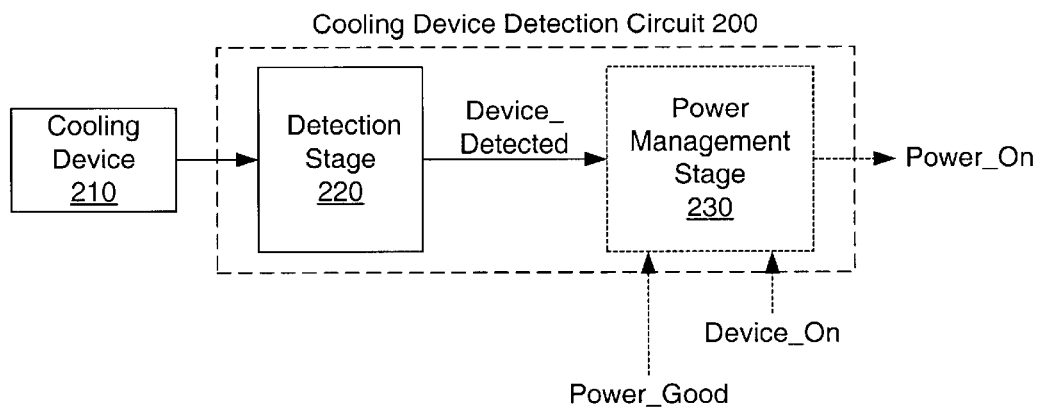
FIG. 2 shows a block diagram of a cooling device detection circuit.

FIG. 2 shows a block diagram of a cooling device detection circuit 200 designed to detect an indication that a cooling device 210 is functioning. The circuit 200 has a detection stage 220. The detection stage 220 is configured to sense an indication that the cooling device 210 is functioning. For example, detection stage 220 may be configured to detect current flowing through the cooling device 210. The detection stage generates a Device_Detected signal that shows whether the detecting stage received the indication that the cooling device 210 is functioning.

In some embodiments, the cooling device detection circuit 200 may also include a power management stage 230. The power management stage 230 may control the Power_On signal. The Power_On signal tells the computer system to start or stop powering a component cooled by the cooling device 210. If the Device_Detected signal indicates that the cooling device is not functioning, the power management stage 230 may tell the computer system to stop powering the component by causing the Power_On signal to be deasserted. In some embodiments, the power management stage may prevent the Power_On signal from being asserted if the cooling device is not detected. The Power_On signal may, in some embodiments, be generated by another device in the computer system such as a south bridge. In those embodiments, the power management stage may be configured to control the Power_On signal in order to start or stop powering a component cooled by a cooling device. In other embodiments, the Power_On signal may instead be generated by the power management stage 230. In one embodiment, the power management stage may also be configured to turn the cooling device on or off.

In addition to receiving Device_Detected, certain embodiments of the power management stage 230 may also receive an additional signal, Device_On, indicating whether the computer system has requested that the cooling device be turned off or on. In these embodiments, the power management stage may be configured to ignore the Device_Detected signal when the system is requesting that the cooling device be turned off (e.g. when the system is in a low power state). The power management stage may, in one embodiment, turn the cooling device on or off in response to the Device_On signal. In some embodiments, the power management stage may receive a signal Power_Good indicating that certain voltages on the motherboard have stabilized. In order to detect the cooling device, the power management stage may allow the cooling device to be turned on by allowing the Power_On signal to be asserted during the time that Power_Good is not yet asserted. Thus, in these embodiments, the power management stage may ignore the Device_Detected signal until the Power_Good signal indicates that the voltages on the motherboard have stabilized. If the cooling device is not detected before Power_Good is asserted, the power management stage may then deassert Power_On.

Figure 3:
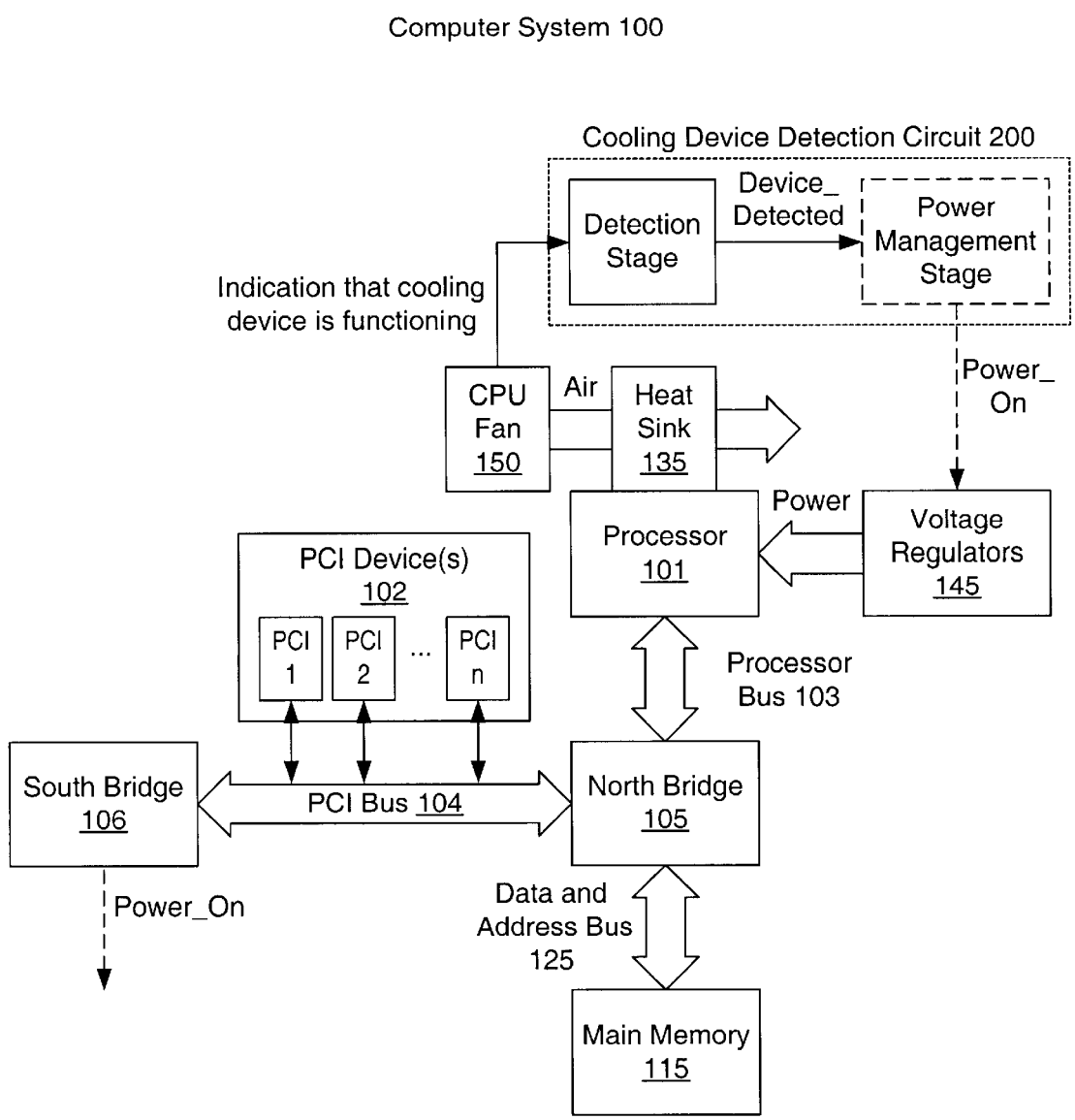
FIG. 3 is a block diagram of a computer system containing a cooling device detection circuit.

In FIG. 3, the cooling device detection circuit 200 has been included in computer system 100. The cooling device detection circuit 200 may be used to detect a cooling device such as the fan 150. The cooling device detection circuit 200 is configured to receive an indication that the cooling device is functioning and to output a Device_Detected signal accordingly. In the system shown in FIG. 1, this may correlate to the fan 150 that is part of the active heat sink coupled to the processor 101. Alternately, the detection stage 220 may be configured to detect a different cooling device in the computer system, such as a power supply fan. In other embodiments, the detection stage 220 may be configured to detect an indication that a cooling device other than a fan is functioning. For example, the detection stage may be configured to detect an indication that a Peltier cooler, a water cooler-type cooler device or a vapor phase refrigeration cooler is functioning. If the Device_Detected signal does not indicate that the device is functioning, some embodiments of the detection circuit 200 may set off an alarm. The detection circuit may set off an alarm by generating an interrupt.

In other embodiments, the cooling device detection circuit 200 may include a power management stage. The Device_Detected signal may be an input to the power management stage of the cooling device detection circuit 200. If the Device_Detected signal indicates that the cooling device is not detected (e.g., the Device_Detected signal is not asserted), the power management stage may cause the computer system 100 to stop powering one or more components cooled by the cooling device. In some embodiments, the components may be processors, graphics processors and/or hard drives. For example, in some embodiments, the cooling device may be the fan 150 and the affected component may be the processor 101. If the cooling device is not detected, the power management stage may cause the voltage regulator 145 to stop powering the processor 101 by deasserting the Power_On signal. In some embodiments, the voltage regulator may be regulating a voltage supplied by another power supply in computer system 100, and the power management stage may turn off that other power supply if the cooling device is not detected. In one embodiment, the Power_On signal controlling voltage regulator 145 may be provided by the power management stage. In another embodiment, the Power_On signal may be provided by another component such as a south bridge and the power management stage may be able to control the Power_On signal in such a way that it can deassert Power_On or prevent Power_On from being asserted if the cooling device is not detected.

Figure 4:
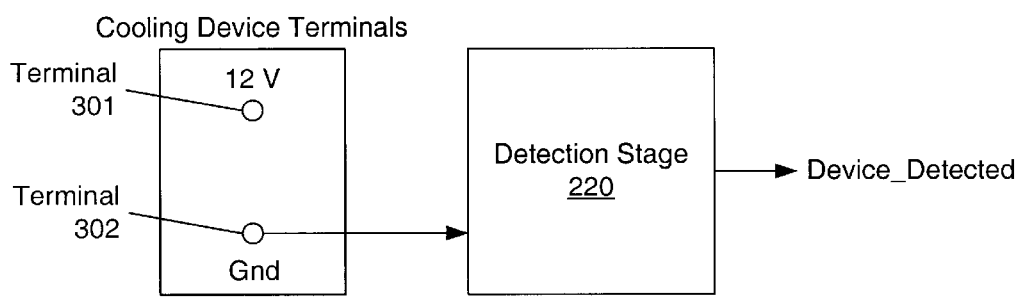
FIG. 4 shows one embodiment of a detection stage of a cooling device detection circuit.

FIG. 4 shows a block diagram of one embodiment of a detection stage 220 that may be used in a cooling device detection circuit 200. Device connectors 301 and 302 may be terminals to which the cooling device should be connected. If the cooling device is connected and receiving power, current will flow from the voltage supply terminal 301 to the ground terminal 302. In some embodiments, the detection stage 220 may be coupled to the ground terminal 302 and configured to sense the current across the cooling device. The detection stage 220 may be configured to sense the current as an indication that the device is functioning. If the detection stage 220 senses current through the device, the detection stage asserts Device_Detected to indicate that the device was detected. If the current through the device is not sensed, the detection stage keeps the Device_Detected signal unasserted.

Figure 5:
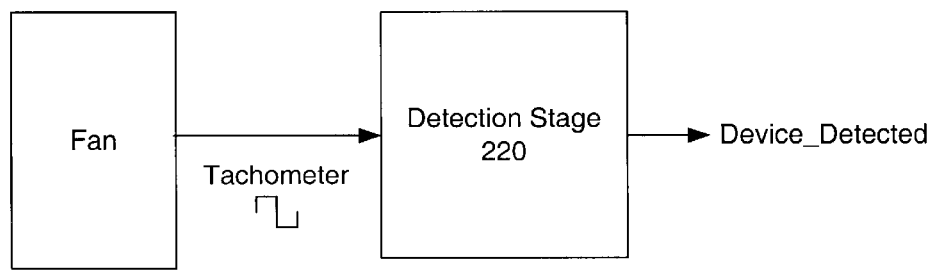
FIG. 5 shows another embodiment of a detection stage of a cooling device detection circuit.

FIG. 5 shows a block diagram of different embodiment of a detection stage 220 that may be used in a cooling device detection circuit 200. In many embodiments, the cooling device may be a fan. Instead of sensing the current through a device like the embodiment shown in FIG. 3, this embodiment senses a fan's tachometer output. The detection stage 220 senses an indication that the fan is functioning based on the tachometer output. If the detection stage 220 detects the indication of fan rotation, it asserts Device_Detected. In some embodiments, the detection stage 220 may sense a first pulse on the tachometer output as an indication that the fan is functioning. If the first pulse is sensed, the detection stage may then assert the Device_Detected signal. In other embodiments, this circuit may also be capable of detecting that the fan is spinning properly throughout its operation. For example, in some embodiments, the detection stage 220 may continuously monitor the tachometer output. Thus, in some embodiments, this detection stage may detect not only that the fan is turned on, but also that it is rotating. However, these embodiments of the detection stage require that the fan being monitored have a tachometer output. In other embodiments, any signal indicating that a cooling device is functioning may be monitored.

Figure 6:
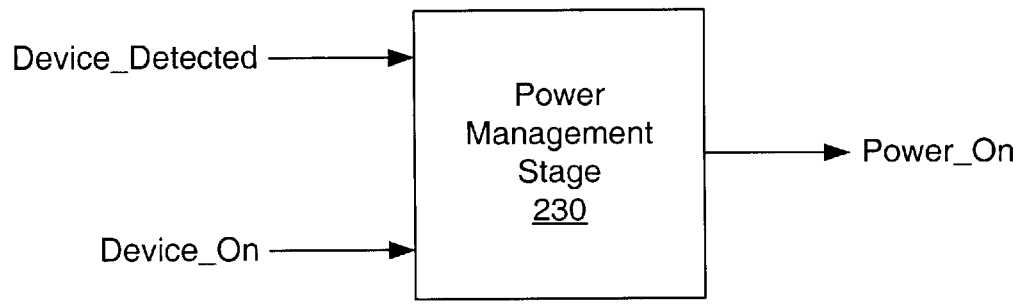
FIG. 6 shows one embodiment of a power management stage of a cooling device detection circuit.

FIG. 6 shows a block diagram of one embodiment of a power management stage 230. The power management stage 230 is configured to receive the Device_Detected signal from a detection stage of the cooling device detection circuit. In some embodiments, the cooling device may be a fan and Device_Detected may also indicate whether the fan is rotating.

The computer system employing a cooling device detection circuit including the power management stage 230 may have power management features, including power conservation modes such as sleep, suspend or standby where the computer system enters one or more low power states. When in a low power state, a component may operate at a lower voltage and thus generate less heat. In some situations, the component may no longer need the cooling device while in a low power state. Thus, in some embodiments, the computer system may turn of the cooling device during a low power state. If the cooling device is off, the detection stage may no longer detect the cooling device. Thus, the power management stage may be configured to ignore the signal from the detection stage while the computer system is in the low power state. Accordingly, the power management stage 230 may receive a Device_On signal indicating whether whether the system is in a low power state. In some embodiments, the Device_On signal may also indicate that the system has turned the cooling device off. In other embodiments, the power management stage may be configured to turn the cooling device off when the computer system is in a low power state.

Figure 7:
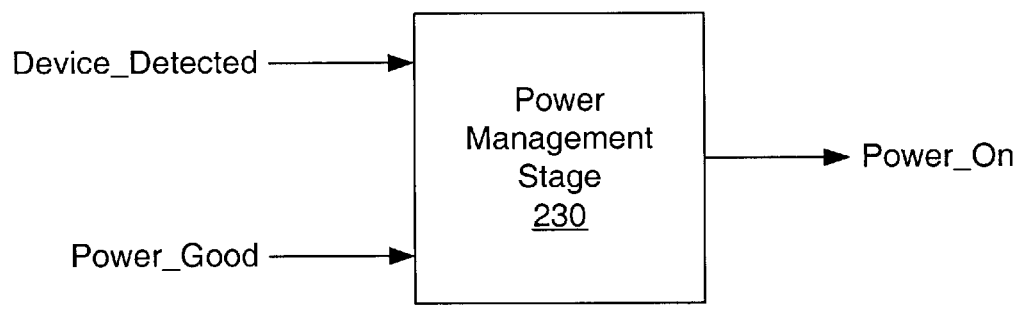
FIG. 7 shows another embodiment of a power management stage of a cooling device detection circuit.

In FIG. 7, a block diagram of a different embodiment of a power management stage 230 is shown. Here, the power management stage 230 receives Device_Detected and Power_Good as inputs. Power_Good may be a signal that indicates whether certain voltages on the motherboard have stabilized. Until these voltages have stabilized, Device_Detected may not correctly indicate whether the device is present and receiving power. As a result, the power management stage 230 may be configured to ignore Device_Detected until Power_Good indicates that the voltages have stabilized. In other embodiments, the power management stage 230 may receive all three signals, Device_Detected, Device_On and Power_Good, as inputs. Additional signals may also be input to the power management stage 230 in certain embodiments.

Figure 8A:
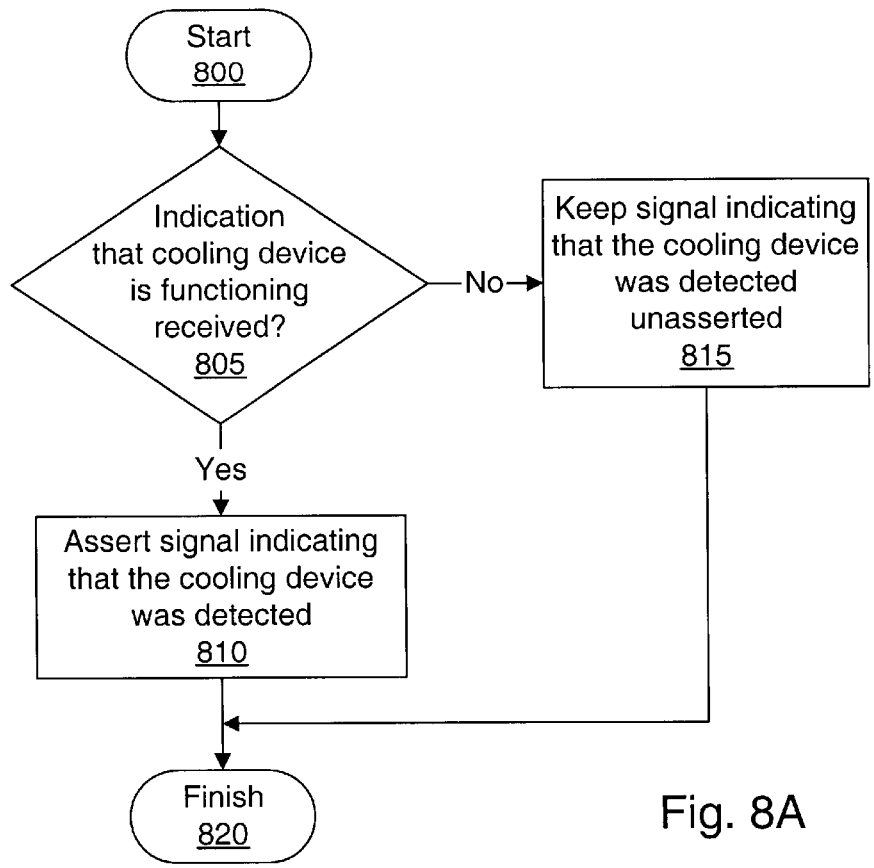
FIGS. 8A and 8B each show an embodiment of a method for detecting a cooling device.

FIG. 8A illustrates one embodiment of a method for detecting a cooling device in a computer system. If an indication that the cooling device is functioning is received at 805, a signal is asserted indicating that the cooling device was detected as indicated at 810. If the indication is not received, the signal is kept unasserted to indicate that the cooling device was not detected, shown at 815. The signal may be a signal such as the Device_Detected signal shown in FIGS. 3–6. The indication that the cooling device is functioning may be an indication that current is flowing through the cooling device or, in embodiments where the cooling device has a tachometer, an indication that the cooling device is rotating.

Figure 8B:
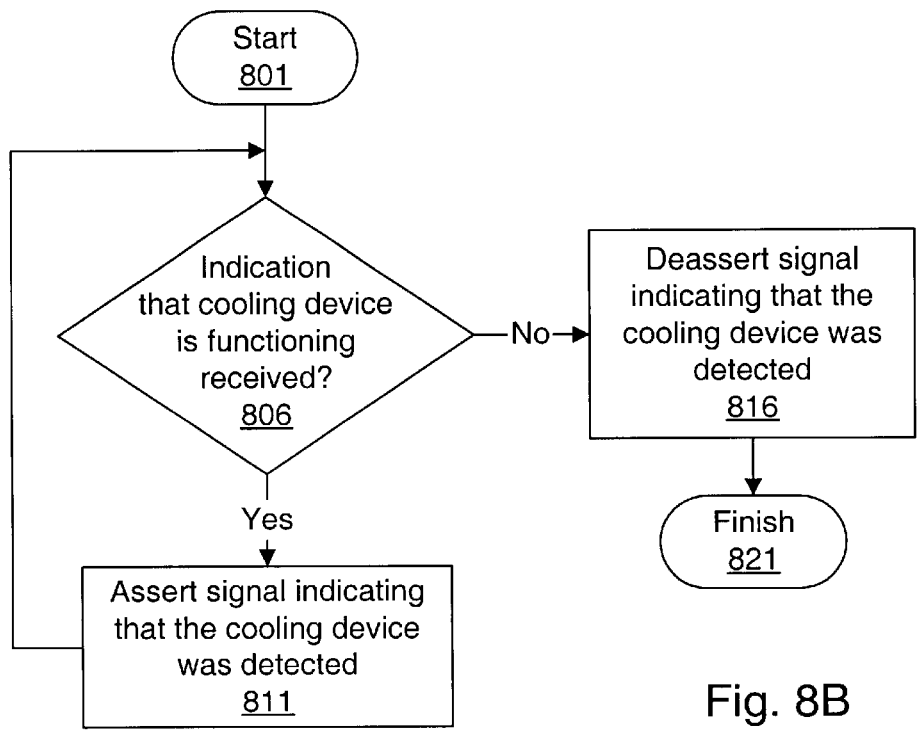

FIG. 8B shows a slightly different embodiment of a method for detecting a cooling device in a computer system. In this embodiment, the indication that the cooling device is functioning is continuously monitored. Thus, after the signal is asserted to indicate that the device was detected at 811, the method again checks the indication that the device is functioning at 806. If at any point the device is not detected, the signal is deasserted to indicate that the device is not detected at 816.

Figure 9A:
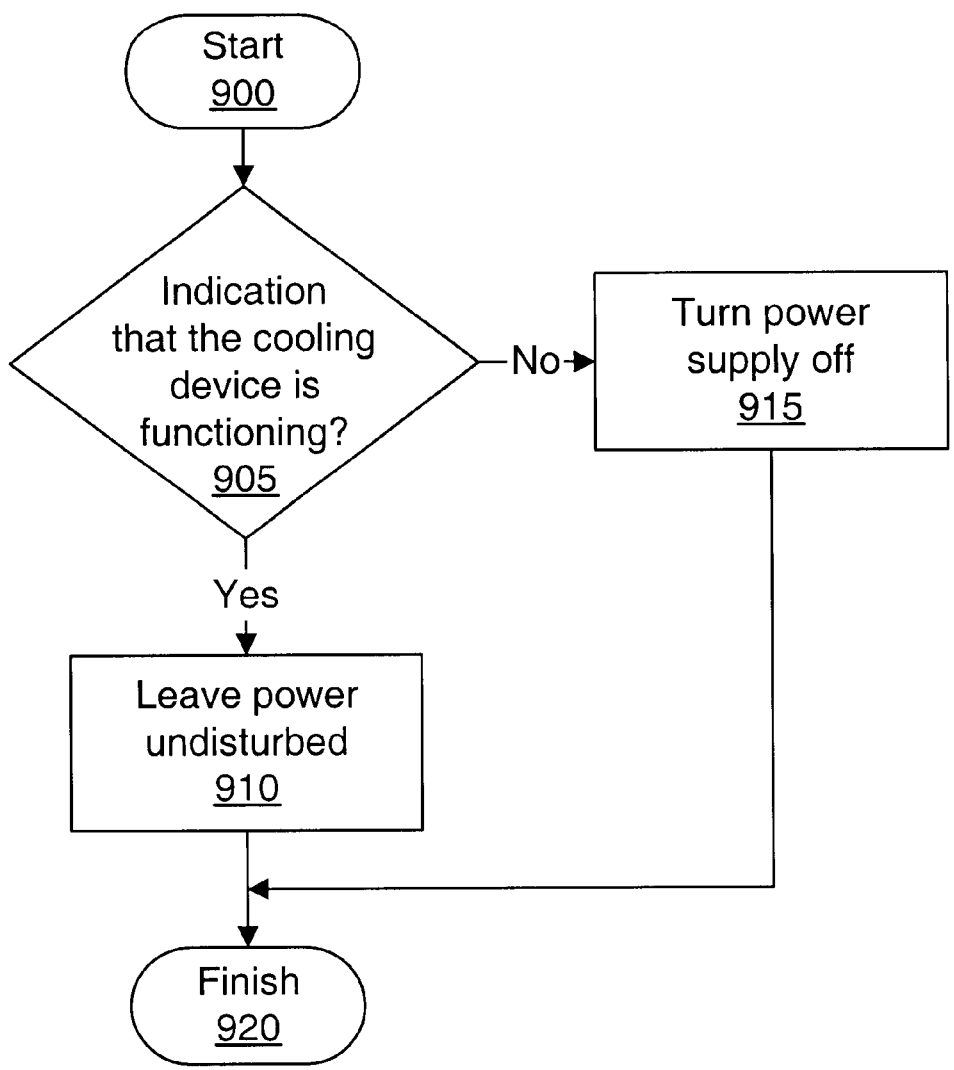
FIGS. 9A and 9B each show an embodiment of a power management method.

FIG. 9A shows a flow chart for one embodiment of a power management method. If there is an indication that the cooling device is not functioning (e.g., Device_Detected is unasserted), the computer system is instructed to stop powering devices affected by the missing or malfunctioning cooling device as indicated at 915. In some embodiments, the power may be turned off by deasserting a power supply signal (e.g. Power_On). In other embodiments, the power supply signal may not have been asserted yet, and the power supply signal may instead be kept desasserted if the cooling device is not detected. For example, in some embodiments certain components in the system, including the cooling device, may be powered first. Powering the cooling device allows the cooling device to be detected in embodiments where the detection circuit senses current, rotation, etc. In some embodiments, other components in the system such as those that are cooled by the cooling device may not be powered until the cooling device has been detected. In one embodiment, when there is an indication that the cooling device is functioning, the power supply signal may be left alone, shown at 910. In some embodiments, this may involve not disturbing a power supply signal that has been generated by another device. In other embodiments, leaving the power supply signal alone may involve continuing to assert a power supply signal. Still other embodiments may instead assert the power supply signal when there is an indication that the cooling device is functioning.

Figure 9B:
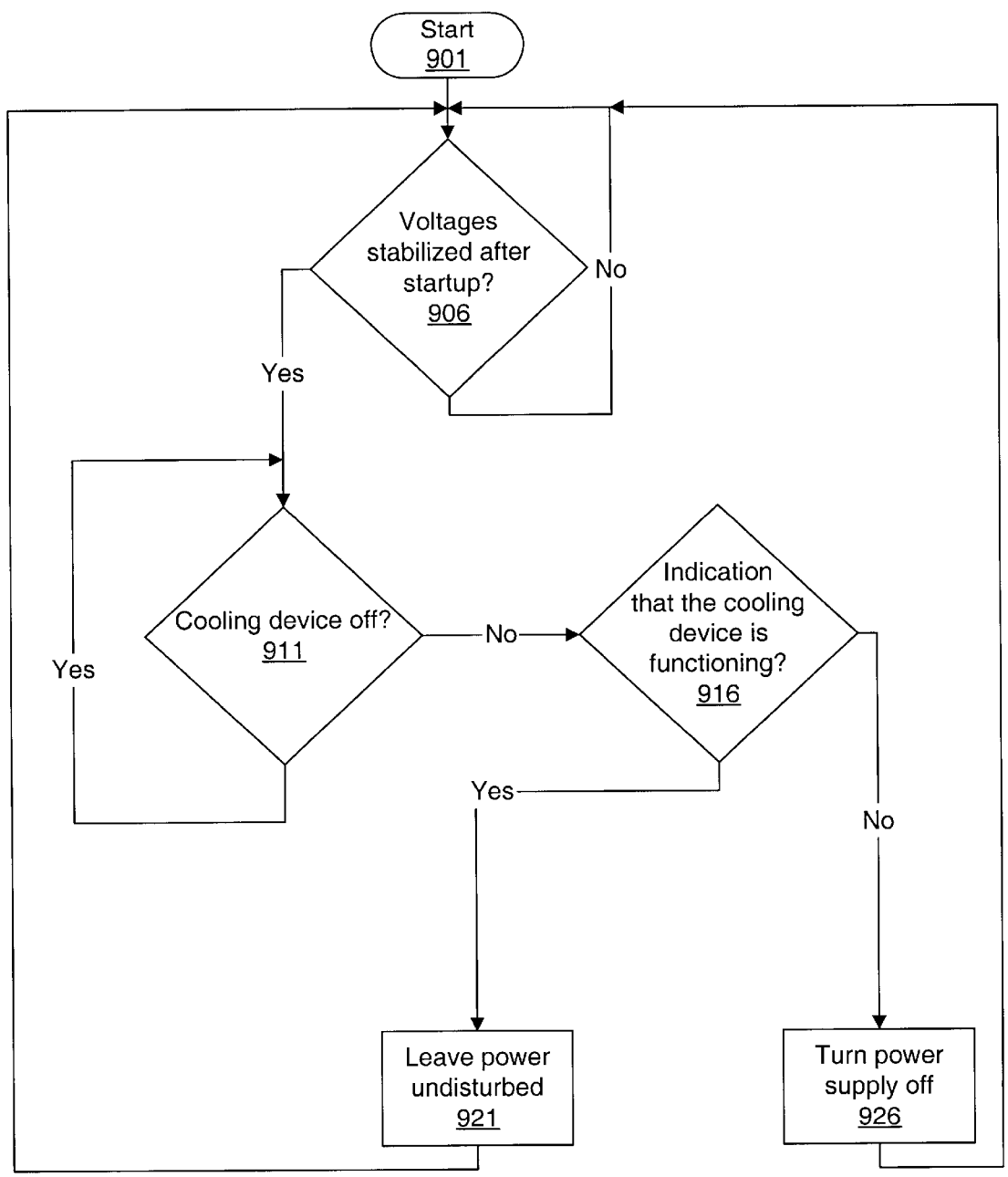

FIG. 9B shows another embodiment of a power management method. In addition to the considering whether there is an indication that the cooling device is functioning, several other factors may also be considered. In some embodiments, if certain voltages on the motherboard have not stabilized (e.g., Power_Good is not asserted), an indication that the cooling device is functioning/not functioning may be ignored as indicated at 906. In some embodiments, this may allow the cooling device to be powered so that the detection circuit can detect it. Once the voltages have stabilized, however, the indication that the cooling device is functioning may be considered again at 916. If the indication that the cooling device is functioning is not sensed, the computer system is instructed to stop powering the devices that were to be cooled by the cooling device.

Another factor that may be considered is whether the system has turned the cooling device off, shown at 911. For example, a computer system may turn off cooling devices while in a power conservation mode. If the computer system has turned the cooling device off (e.g. Device_On is unasserted), the indication that the cooling device is functioning/not functioning may be ignored until the computer system turns the cooling device back on. Some embodiments may consider both of these additional factors, while others may only consider one or the other.

Figure 10:
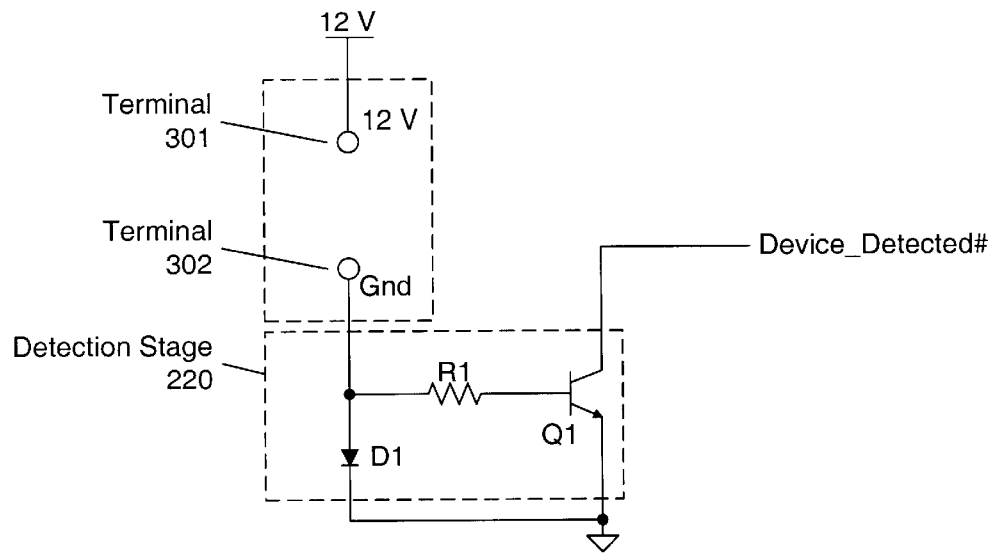
FIG. 10 shows another embodiment of a detection stage of a cooling device detection circuit.

FIG. 10 shows another embodiment of a detection stage 220. Cooling device terminals 301 and 302 are input terminals to which the cooling device may be connected. If the cooling device is connected and receiving power, current will flow from the 12 V supply terminal 301 to the ground terminal 302. In this circuit, the detection stage senses the current across the cooling device. The detection stage may include a diode D1 placed between the cooling device's ground terminal 302 and ground, a transistor Q1 and a resistor R1. If current is flowing across the cooling device terminals, current will flow through the diode D1, producing a voltage drop across the diode D1. This voltage drop across diode D1 causes transistor Q1 to turn on. When transistor Q1 turns on, it asserts the Device_Detected# signal by pulling the active low signal Device_Detected# low. The Device_Detected signal may be provided to a power management stage in some embodiments. In other embodiments, the Device_Detected# signal may be provided to another component in the computer system such as an alarm circuit. When no current flows across the diode D1, Q1 remains off and Device_Detected is not asserted.

Figure 11:
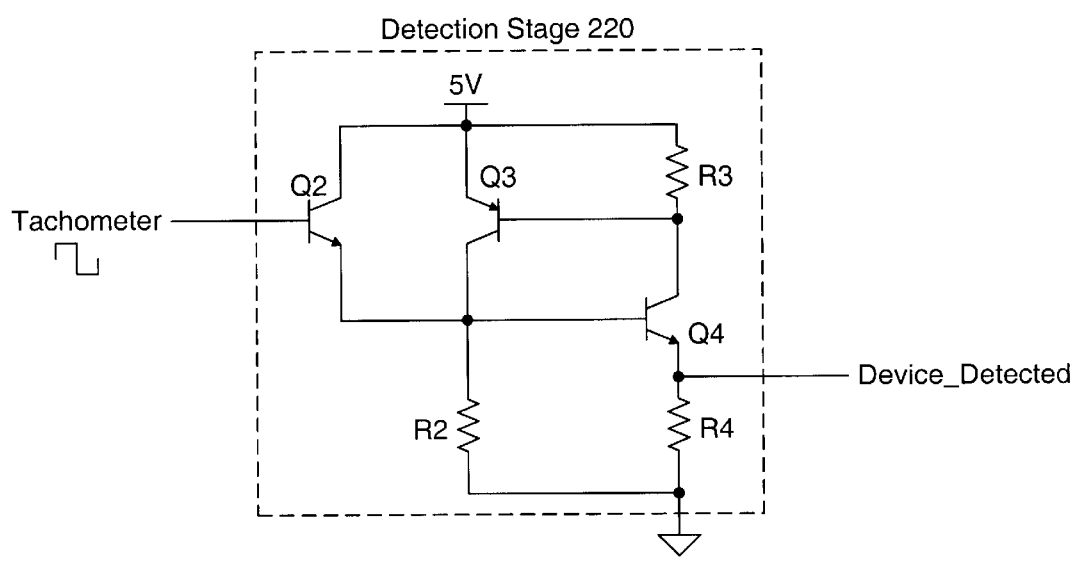
FIG. 11 shows another embodiment of a detection stage of a cooling device detection circuit.

Looking now at FIG. 11, another embodiment a detection stage 220 is shown. In this embodiment, the cooling device detecting stage is configured to monitor the cooling device's tachometer. The cooling device detecting stage may include three transistors, Q2, Q3 and Q4. The cooling device tachometer outputs a square wave with a frequency proportional to the cooling device's rotational speed. When the tachometer signal rises for the first time, a voltage is applied to, transistor Q2 turns on. When Q2 turns on, current flows across resistor R2, causing a voltage drop across R2. The voltage across R2 causes transistor Q4 to turn on. When Q4 turns on, current flows through resistor R4, producing a voltage across R4 and causing the Device_Detected signal to be asserted high. Since the tachometer has provided an indication that the device is rotating properly, the remainder of the circuit latches the tachometer signal, causing Device_Detected to continue to be asserted high for as long as the power is supplied to the detection stage. This ignores the periodic lows in the tachometer square wave output. Thus, when transistor Q4 turns on, the voltage drop across resistor R3 causes transistor Q3 to turn on. Once transistor Q3 turns on, current will continue to flow across resistor R2 until the power to the detection stage is turned off. Thus, the transistor Q4 will remain on and the active high Device_Detected signal will continue to be asserted high until the power to the detection stage is turned off. Another embodiment of a detection stage may continuously monitor a tachometer signal instead of latching the first pulse.

Figure 12:
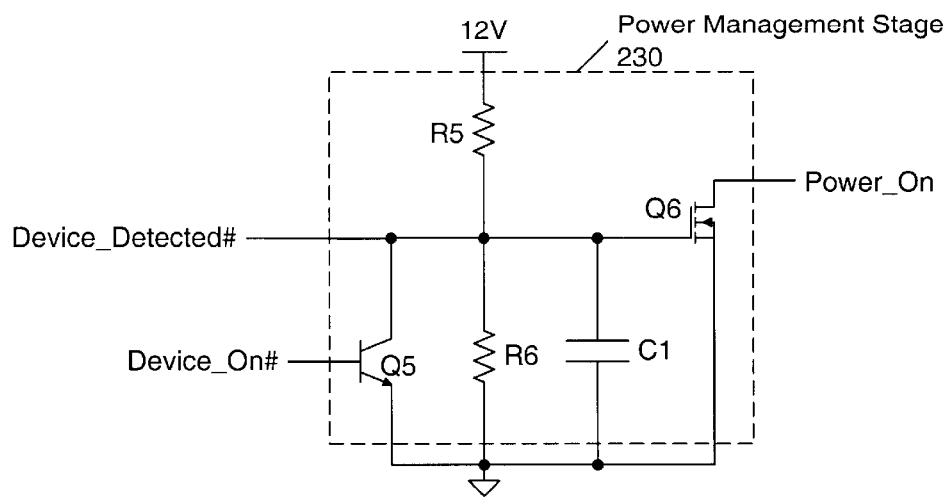
FIG. 12 shows another embodiment of a power management stage of a cooling device detection circuit.

In some embodiments, the cooling device detection circuit may also have a power management stage. One embodiment of a power management stage is shown in FIG. 12. This embodiment may include transistor Q5, resistors R5 and R6, capacitor C1, and transistor Q6. An active low Device_Detected# signal may be provided from a detection stage such as those shown in FIGS. 3–4 and 8–9. An active high Power_On signal may be asserted by another components in the system such as a south bridge. If the cooling device is not detected, Device_Detected# is high, causing Q6 to turn on, deasserting Power_On. When the cooling device is detected, the voltage applied to the gate of Q6 is low, so Q6 does not turn on and Power_On is not deasserted by the power management stage.

A computer system may turn off the cooling device in certain situations, such as when the computer system is entering a power conservation stage. Thus, an active low signal, Device_On#, indicating that the computer system is not in a low power state and/or that the cooling device has been turned on may also be provided to the power management stage. This signal is applied to the base of transistor Q5, so when the cooling device is on and Device_On# is low, Q5 does not turn on and the voltage applied to the gate of transistor Q6 depends on Device_Detected#, as explained above. However, when the cooling device has been turned off or when the system is in a low power state, Device_On# is high, causing Q5 to turn on and pull the voltage applied to the gate of Q6 low. This effectively ignores the Device_Detected# signal when the computer system turns the cooling device off and/or enters a low power state. A voltage divider including resistors R5 and R6 may be placed across the 12 V source to lower the voltage input to the gate of Q6. The capacitor C1 provides noise immunity to Q6 and also adds hystereses to the circuit. In this embodiment, the power management stage controls an active high signal Power_On that is provided by another component in the computer system by either deasserting Power_On or leaving it undisturbed. In other embodiments, however, the power management stage may generate the Power_On# signal.

TABLE 1

Truth Table for the Power Management Stage in FIG. 12.

| Device_Detected# | Device_On# | Power_On |
|---|---|---|
| 0 | 0 | Undisturbed |
| X | 1 | Undisturbed |
| 1 | 0 | 0 |

Table 1 provides a truth table for the operation of the embodiment shown in FIG. 12. When Device_On# is inactive high, indicating that the system has requested the cooling device be turned off, the Device_Detected# signal is ignored. Therefore, whenever the system has turned the cooling device off, the power management stage leaves the Power_On signal alone. When the cooling device is supposed to be on, and thus Device_On# is active low, the Device_Detected# signal is monitored by the power management stage. When no current is detected, Device_Detected# is inactive high and the power management stage drives Power_On inactive low, instructing the system to turn the power off.

Figure 13:
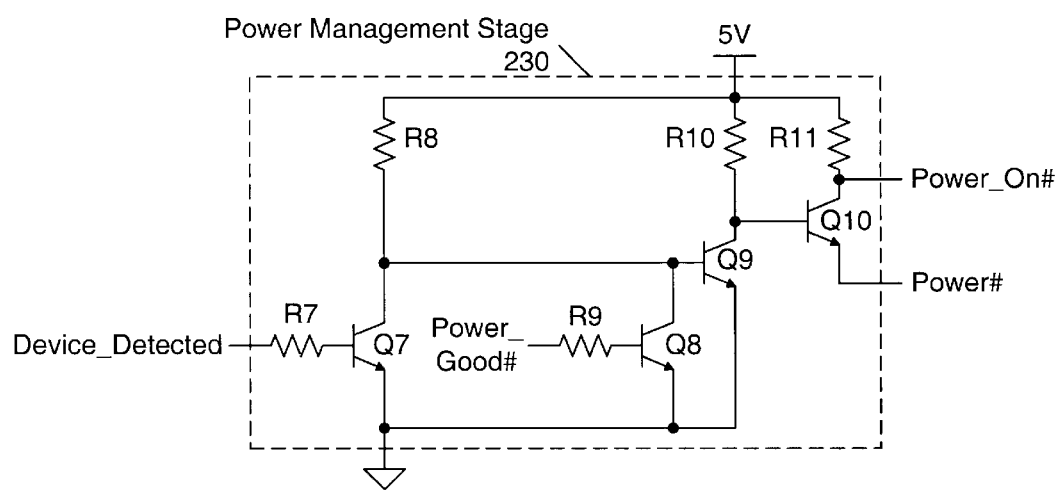
FIG. 13 shows another embodiment of a power management stage of a cooling device detection circuit.

Another embodiment of a power management stage is illustrated in FIG. 13. The embodiment shown in FIG. 13 may receive two inputs. The Device_Detected signal may be received from a detection stage such as those shown in FIGS. 4–5 and 9–10. An active low signal, Power_Good#, indicating that certain voltages on the motherboard have stabilized, may also be provided to the power management stage. In some embodiments, the Power_Good# signal may be generated by a south bridge or a power supply. In this embodiment, the power management stage controls an active low signal Power_On# by deasserting the signal in certain circumstances. When the power management stage is not deasserting Power_On#, Power_On# is approximately equal to Power#, which may be generated by another component in the computer system to indicate that the system power should be tuned on (when Power# is low) or off (when Power# is high). In other embodiments, the power management stage may generate the Power_On# or Power# signals itself instead of only controlling the Power_On# signal.

The power management stage may, in some embodiments, include four transistors Q7–Q10 and four resistors R7–R11. When the Device_Detected signal is asserted high, indicating that the cooling device was detected, Q7 turns on. This causes Q9 to turn off and Q10 to turn on. When Q10 turns on, Power_On# is approximately equal to Power# (while the voltages are not equal, the signals are equivalent from a binary state standpoint). If the Device_Detected signal is unasserted, indicating that the cooling device was not detected, Q7 does not turn on. As a result, Q9 turns on unless, as will be discussed in more detail below, the Power_Good# signal has not been asserted. This causes Q10 to turn off and the Power_On# signal is pulled high. Since Power_On# is active low in this embodiment, a high Power_On# means that Power_On# is unasserted. Power_On# may be a control signal to a system power supply such that an unasserted Power_On# will cause the computer system to stop powering components cooled by the cooling device that was not detected.

Because the cooling device cannot be detected until it is turned on in certain embodiments of the detection stage, this embodiment of the power management stage allows Power_On# to be asserted before the cooling device is detected. When the Power_Good# signal is high, indicating that the voltages have not yet stabilized, Q8 turns on, turning transistor Q9 off. Turning Q9 off turns Q10 on and allows Power_On# to approximately equal Power#. Thus, when Power# is asserted, the system (and cooling device) is powered and thus the detection circuit can detect an indication of whether or not the cooling device is functioning. If the cooling device has not been detected as functioning before Power_Good# is asserted, however, the power management stage will deassert Power_On# by pulling it high. Thus, in an embodiment, Power_Good# is delayed to provide the detection circuit with time to detect the cooling device before Power_Good# is asserted.

TABLE 2

Truth Table for the Power Management Stage in FIG. 13.

| Device_Detected | Power_Good# | Power_On# |
|---|---|---|
| 0 | 0 | 1 |
| X | 1 | Power# |
| 1 | 0 | Power# |

Table 2 shows a truth table for this embodiment of the power management stage. The power management stage ignores Device_Detected until Power_Good# is asserted active low. If Device_Detected is asserted active high when Power_Good# is asserted, the cooling device is working properly and the power supply is allowed to remain on. If Device_Detected is not asserted when Power_Good# is asserted, the Power_On# signal is deasserted to turn off the power supply.

Numerous variations and modifications will become apparent to those skilled in the art once the above disclosure is fully appreciated. For example, some embodiments of a fan detection circuit may include a cooling device detection stage such as is shown in FIGS. 9 and 10 and a power management stage such as those shown in FIGS. 11 and 12. Other embodiments may combine power management stages such as those shown in FIGS. 11 and 12. It is intended that the following claims be interpreted to embrace all such variations and modifications.

What is claimed is:

1. A computer system, comprising:
   a component;
   a power supply that provides power to the component;
   a cooling device configured to cool the component; and
   a cooling device detection circuit comprising:
      a detection stage configured to detect the cooling device by sensing an indication that the cooling device is functioning; and
      a power management stage coupled to the detection stage,
         wherein the power management stage is configured to receive an input indicating whether the computer system is in a power conservation mode,
         wherein the power management stage is configured to turn the power supply off if the cooling device is not detected and the computer system is not in a power conservation mode,
         wherein the power management stage is configured to not turn off the power supply if the cooling device is not detected and if the computer system is in a power conservation mode.

2. The computer system as recited in claim 1, wherein the component comprises a hard drive.

3. The computer system as recited in claim 1, wherein the component comprises a graphics processor.

4. The computer system as recited in claim 1, wherein the component comprises a central processing unit (CPU).

5. The computer system as recited in claim 4, wherein the cooling device comprises a fan coupled to a passive heat sink coupled to the CPU.

6. The computer system as recited in claim 1, wherein the cooling device comprises a fan configured to cool a main power supply in the computer system.

7. The computer system as recited in claim 1, wherein the indication that the cooling device is functioning comprises an indication that current is flowing across the cooling device.

8. The computer system as recited in claim 1, wherein the cooling device comprises a fan and the indication that the cooling device is functioning comprises a tachometer signal.

9. The computer system as recited in claim 1, wherein the power management stage is further configured to turn the cooling device off if the computer system is in the power conservation mode.

10. The computer system as recited in claim 1, wherein the power management stage is further configured to receive an input indicating whether the computer system is requesting that the cooling device be turned off.

11. The computer system as recited in claim 1, wherein the power management stage is further configured to receive an input indicating whether the voltages in the computer system have stabilized.

12. The computer system as recited in claim 1, wherein the power management stage is further configured to turn the power supply off by deasserting a signal controlling the power supply.

13. The computer system as recited in claim 12, further comprising a south bridge configured to generate the signal.

14. A method for detecting a cooling device in a computer system, comprising:
   detecting a cooling device, wherein said detecting comprises sensing an indication that the cooling device is functioning;
   sensing whether the computer system is in a power conservation mode;
   if the cooling device is not detected and the computer system is not in a power conservation mode, turning off a power supply, wherein the power supply provides a component cooled by the cooling device with power; and
   if the cooling device is not detected and the computer system is in a power conservation mode, not turning off a power supply.

15. The method recited in claim 14, wherein the component is a CPU.

16. The method recited in claim 14, further comprising sensing whether a plurality of voltages in the computer system have stabilized.

17. The method recited in claim 14, further comprising sensing whether the computer system is requesting that the fan be turned off.

18. The method recited in claim 14, wherein said sensing comprises sensing a current flowing from a ground terminal of the cooling device to ground.

19. The method recited in claim 18, wherein said sensing the current comprises placing a diode between the ground terminal of the cooling device and ground.

20. The method recited in claim 14, wherein said sensing further comprises sensing a tachometer signal.

21. The method as recited in claim 20, wherein said sensing the tachometer signal comprises latching a first pulse of the tachometer signal.

22. The method recited in claim 14, wherein the cooling device is coupled to a heat sink coupled to a CPU.

23. The method as recited in claim 14, wherein said turning the power supply off comprises deasserting a signal controlling the power supply.

24. A cooling device detection circuit, comprising:
   a current-detecting device configured to sense current flowing from a ground terminal of a cooling device to ground;
   a signaling device configured to assert a detection signal if the current-detecting device senses the current and to deassert the detection signal if the current-detecting device does not sense the current; and
   a power management device coupled to the detection device,
      wherein the power management device is configured to receive an input indicating whether the computer system is in a power conservation mode,
      wherein the power management device is configured to turn the power supply off if the cooling device is not detected and the computer system is not in a power conservation mode,
      wherein the power management device is configured to not turn off the power supply if the cooling device is not detected and if the computer system is in a power conservation mode.

25. The cooling device detection circuit of claim 24, wherein the current-detection device comprises a diode and a transistor, wherein the diode is coupled between a ground terminal of the cooling device and ground, wherein a voltage drop is produced across the diode when current flows from the ground terminal to ground, and wherein the transistor is configured to turn on in response to the voltage drop being produced across the diode.

26. The cooling device detection circuit of claim 24, wherein the signaling device comprises a transistor configured to turn on in response the current-detecting device sensing the current and to turn off in response to the current-detecting device not sensing the current.

27. The cooling device detection circuit of claim 24, further comprising a power management stage configured to turn a power supply off if the detection signal is not asserted, wherein the power supply supplies power to a component cooled by the cooling device.

28. The cooling device detection circuit of claim 24, further comprising an interface configured to generate an interrupt that causes an alarm if the detection signal is not asserted.

29. A fan detection circuit, comprising:
   a tachometer-detecting device configured to sense a tachometer signal provided by a fan;
   a signaling device configured to assert a detection signal if the tachometer-detecting device senses the tachometer signal and to keep the detection signal unasserted if the tachometer-detecting device does not sense the tachometer signal; and
   a power management device coupled to the detection device,
      wherein the power management device is configured to receive an input indicating whether the computer system is in a power conservation mode,
      wherein the power management device is configured to turn the power supply off if the cooling device is not detected and the computer system is not in a power conservation mode,
      wherein the power management device is configured to not turn off the power supply if the cooling device is not detected and if the computer system is in a power conservation mode.

30. The fan detection circuit of claim 29, wherein the tachometer-detecting device is configured to sense the tachometer signal by continuously monitoring the tachometer signal.

31. The fan detection circuit of claim 29, wherein the tachometer-detecting device is configured to sense the tachometer signal by latching a first pulse of the tachometer signal.

32. The fan detection circuit of claim 29, further comprising a power management stage configured to turn a power supply off if the detection signal is not asserted, wherein the power supply supplies power to a component cooled by the fan.

33. The fan detection circuit of claim 29, further comprising an interface configured to initiate an interrupt that causes an alarm if the detection signal is not asserted.

* * * * *